Patented May 31, 1932

1,860,487

UNITED STATES PATENT OFFICE

ALFRED THAUSS, OF COLOGNE-DEUTZ, GUSTAV MAUTHE, OF COLOGNE-HOLWEIDE, AND ARNOLD DOSER, OF COLOGNE-MULHEIM, GERMANY, ASSIGNORS, BY MESNE ASSIGNMENTS, TO GENERAL ANILINE WORKS INC., OF NEW YORK, N. Y., A CORPORATION OF DELAWARE

WATER SOLUBLE CONDENSATION PRODUCTS OF SULPHONATED AROMATIC HYDROCARBONS OR HYDROXY DERIVATIVES THEREOF WITH ARALKYL HALIDES

No Drawing. Application filed October 19, 1928, Serial No. 313,635, and in Germany October 31, 1927.

The present invention relates to new water soluble condensation products and to a process of preparing them, more particularly it relates to a process which comprises dissolving a sulphonated aromatic hydroxy hydrocarbon in strong sulphuric acid and treating the solution with an aralkyl halide containing at least one halogen atom in the aryl nucleus.

The preferred form of carrying out our new process comprises dissolving the aromatic hydroxy sulphonic acid, such as a sulphonic acid of phenol, naphthols, cresols, halogen-phenols, etc., in an excess of strong sulphuric acid, thoroughly mixing the solution with the halogen-aralkyl halide, such as a chloro benzyl chloride, and well stirring the mixture by means of rapid stirrers and while gently heating for about 6 to 24 hours until the evolution of hydrogen chloride, which soon commences and uniformly proceeds, has ceased.

The reaction takes place according to the following equation:

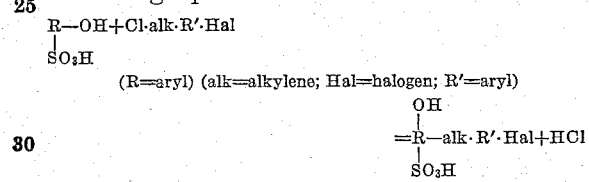

(R=aryl) (alk=alkylene; Hal=halogen; R'=aryl)

The quantity of the halogen-aralkyl halide used in the condensation is not limited to the molecular quantity, but may often be increased to twice that amount and even more without thereby impairing the good solubility of the condensation products in water.

Obviously it is not necessary to start with the isolated sulphonic acids of aromatic hydroxy hydrocarbons, but the aralkyl halides may be added directly to the sulphonating mixture in which the sulphonic acids were prepared, without departing from our invention.

When the condensation is finished the reaction products may be isolated in any appropriate manner.

The products thus obtainable are in form of their alkali metal salts weakly colored powders easily soluble in water. They possess in the free form as well as in the form of their alkali metal salts the valuable technical property of preventing animal fibers, such as wool and silk, (to which fibers they may be applied, for instance, in form of their aqueous solution) from absorbing dyestuffs. Our new products are, therefore, useful auxiliary substances in dyeing and printing.

When applying our new products, for instance, to mixed textile fabrics made of cotton and silk or cotton and wool, etc. which are to be printed or dyed, the animal fibers, i. e. the silk or the wool, in the mixed fabrics are prevented from taking up the dyestuffs. In this manner multicolor effects are easily to be obtained. Our new resists may be applied to the fibers either before or during the dyeing processes. Our new products have the further property of precipitating glue especially when used in an acid medium.

The following example illustrates our invention without limiting it thereto:—

*Example 1.*—19 parts by weight of phenol are converted by means of 30 parts by weight of sulphuric acid monohydrate into a monosulphonic acid, the mixture is then thoroughly stirred with a further quantity of 20 parts by weight of monohydrate and 20 parts by weight of fuming sulphuric acid of 20% strength and finally 32 parts by weight of ortho chloro benzyl chloride are added while gently heating to about 40 to 50° C. When the evolution of hydrogen chloride has ceased the reaction product has separated as a fairly hard lump from which the excess of acid can be poured off. With water a clear viscous solution is obtained, which can either be employed per se or neutralized with an alkali, whereby an alkali metal salt of the product is obtained. In moderately dilute solutions of these products strong acids or sodium chloride solutions cause re-precipitation in the bright, resinous form. The product is in form of its alkali metal salts a nearly colorless powder easily soluble in water. The new product has the property of preventing animal fibers from absorbing dyestuffs and, therefore, can be used as a resist in dyeing and printing textile fibers.

We claim:—

1. The process which comprises causing an aralkyl halogenide containing at least one halogen atom in the aryl nucleus to act upon an aromatic hydroxy sulphonic acid in the presence of strong sulphuric acid.

2. The process which comprises reacting upon a sulphonated phenol with a chlorobenzylchloride in strong sulphuric acid at a temperature of about 40° to 50° C.

3. The process which comprises converting 19 parts by weight of phenol into a monosulphonic acid by means of 30 parts by weight of sulphuric acid monohydrate, adding 20 parts by weight of sulphuric acid monohydrate, 20 parts by weight of fuming sulphuric acid of 20% strength and 32 parts by weight of technical chlorobenzyl chloride and heating the mixture while stirring for about 12 hours to 40–50° C.

4. The products obtainable according to the process claimed in claim 1, said products being soluble in water, the concentrated aqueous solutions having a viscous form, being capable of forming alkali metal salts which are weakly colored powders easily soluble in water, and being capable of preventing animal fibres from taking up dyestuffs.

5. The products obtainable according to the process claimed in claim 2, said products being soluble in water, the concentrated aqueous solutions having a viscous form, being capable of forming alkali metal salts which are weakly colored powders easily soluble in water, and being capable of preventing animal fibres from taking up dyestuffs.

6. The product obtainable according to the process claimed in claim 3, said product being soluble in water to form a clear viscous solution, being capable of forming alkali metal salts which are nearly colorless powders easily soluble in water, and being capable of preventing animal fibres from taking up dyestuffs.

In testimony whereof we have hereunto set our hands.

ALFRED THAUSS.
GUSTAV MAUTHE.
ARNOLD DOSER.